US006987549B2

(12) United States Patent
Wu et al.

(10) Patent No.: US 6,987,549 B2
(45) Date of Patent: Jan. 17, 2006

(54) FAST RESPONSE IN-PLANE-SWITCHING PI-CELL LIQUID CRYSTAL DISPLAYS

(75) Inventors: Shin-Tson Wu, Oviedo, FL (US); Thomas X. Wu, Orlando, FL (US); Qi Hong, Orlando, FL (US); Xinyu Zhu, Orlando, FL (US); Ruibo Lu, Orlando, FL (US)

(73) Assignee: University of Central Florida Research Foundation, Inc, Orlando, FL (US)

( * ) Notice: Subject to any disclaimer, the term of this patent is extended or adjusted under 35 U.S.C. 154(b) by 63 days.

(21) Appl. No.: 10/639,985

(22) Filed: Aug. 13, 2003

(65) Prior Publication Data

US 2004/0183974 A1    Sep. 23, 2004

Related U.S. Application Data

(60) Provisional application No. 60/405,976, filed on Aug. 26, 2002.

(51) Int. Cl.
   G02F 1/1337      (2006.01)
   G02F 1/139       (2006.01)

(52) U.S. Cl. .................. 349/123; 349/132; 349/141; 349/177; 349/187

(58) Field of Classification Search ............ 349/132, 349/136, 141, 178, 187, 123, 177, 126
See application file for complete search history.

(56) References Cited

U.S. PATENT DOCUMENTS

| 6,356,329 B1 | 3/2002 | Tamatani et al. ........... 349/141 |
| 2003/0043098 A1 * | 3/2003 | Aoyama et al. ............. 345/87 |

OTHER PUBLICATIONS

R. A. Soref, Transverse field effects in nematic liqud crystals, Appl. Phys. Lett, vol. 22, No. 4, Feb. 15, 1973, pp 165-166.
R. A. Soref, Field effects in nematic liquid crystals obtained with interdigital electrodes, J. Appl. Phys., vol. 45, No. 12, Dec. 1974, pp 5466-5468.
Mashito Oh-e and Katsumi Kondo, Electro-optical characteristics and switching behavior of the in-plane switching mode, Appl. Phys. Lett. 67 (26) Dec. 25, 1995, pp 3895-3897.
R. Kiefer, et al, P2-30 in-plane switching of nematic liquid crystals, Japan Display, '92, pp 547-550.
Masahito Oh-e, et al., Switching of negative and positive dielectro-anisotropic liquid crystals by in-plane electric fields, J. Appl. Phys. 82 (20, Jul. 15, 1997, pp 528-535.
Philip J. Bos and K. Rickey Koehler/Beran, The pi-cell: A fast liquid crystal optical-switching device, Mol. Crys.t. Liq Cryst., 1984, vol. 113, pp 329-339.
S. H. Lee, et al., P-55: Influence of rubbing direction on the electro-optic characteristics Of in-plane-switching-mode LCD's, SID 97 Digest, pp 711-714.

* cited by examiner

Primary Examiner—Dung T. Nguyen
Assistant Examiner—Tai Duong
(74) Attorney, Agent, or Firm—Brian S. Steinberger; Law Offices of Brian S. Steinberger, P.A.

(57) ABSTRACT

Transmissive liquid crystal displays having response time that can be approximately 2 to approximately 3 times faster than conventional displays. The displays adjust the rubbing angles to above approximately 20 degrees and preferably between approximately 30 and approximately 40 degrees. The displays have fast response times, enhanced brightness and increased gray scale linearity while maintaining wide viewing angle.

14 Claims, 5 Drawing Sheets

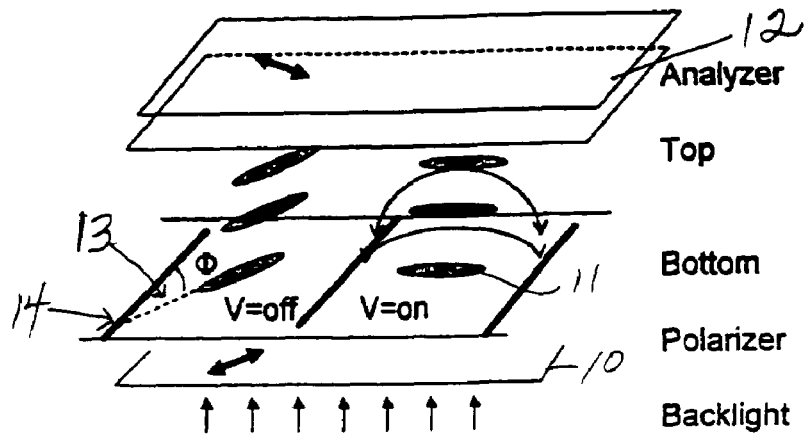
Fig. 1
(Prior Art)
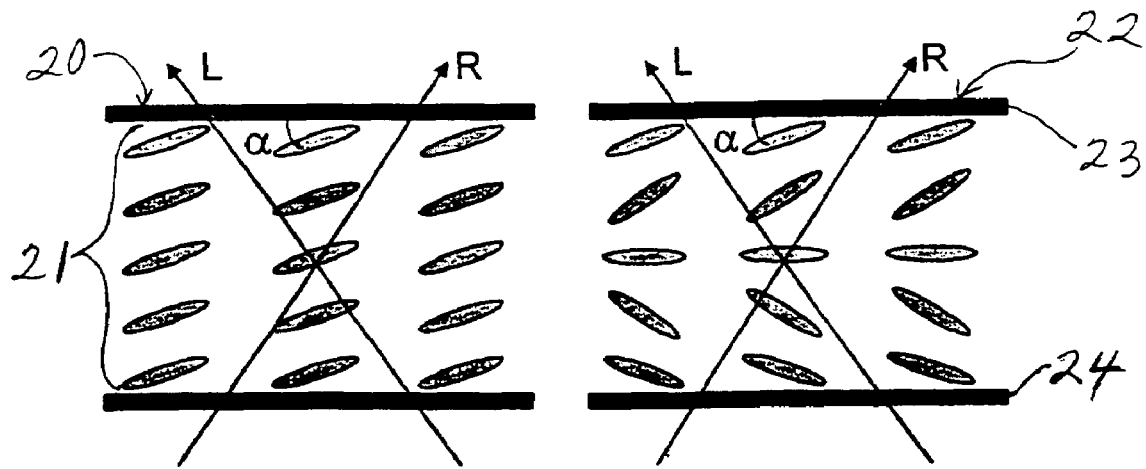
Fig. 2a
(Prior Art)
Fig. 2b
(Prior Art)

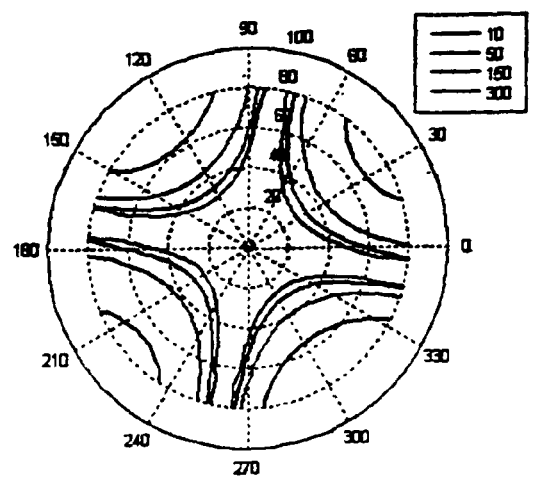
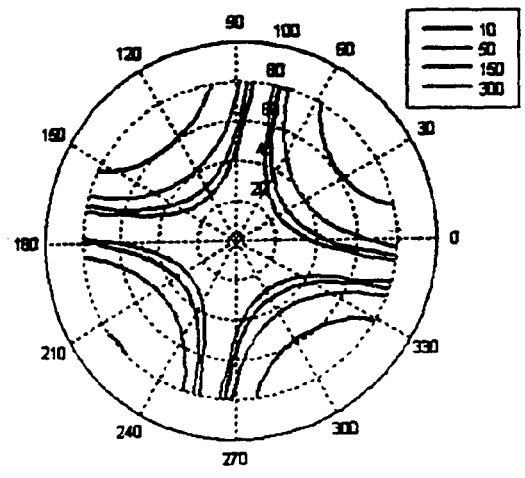
Fig. 3a
(Prior Art)
Fig. 3b
(Prior Art)
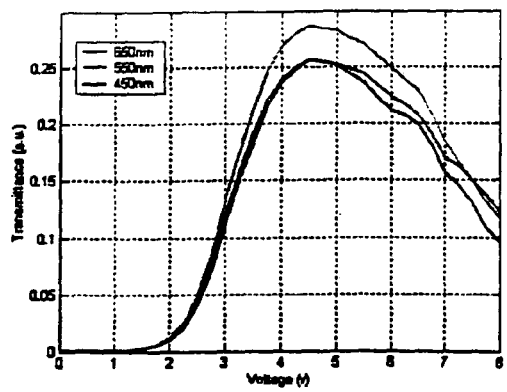
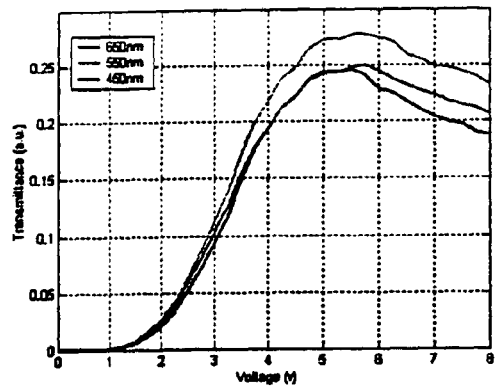
Fig. 4a
Fig. 4b

FAST RESPONSE IN-PLANE-SWITCHING PI-CELL LIQUID CRYSTAL DISPLAYS

This invention claims the benefit of priority to U.S. Provisional patent application 60/405,976 filed Aug. 26, 2002.

FIELD OF THE INVENTION

This invention relates to transmissive liquid crystal displays, and in particular to using large rubbing angles for decreasing the response time, reducing the threshold voltage, enhancing the display brightness and increasing the gray scale linearity while retaining wide viewing angle.

BACKGROUND AND PRIOR ART

The in-plane switching (IPS) of a liquid crystal display (LCD) as depicted in FIG. 1 was invented more than 3 decades ago. Unlike the twisted-nematic (TN) cell where the applied electric field is in the longitudinal (length-wise) direction, the IPS electric field is in the transverse (crosswise) direction. The liquid crystal (LC) molecules are rotated in the same plane. As a result, the IPS mode exhibits a wide viewing angle and high contrast ratio, and has been used widely for desktop computer monitors and LCD television monitors.

Referring to FIG. 1, the polarizer 10 axis is parallel to the LC alignment in the bottom plate 11 and the analyzer 12 is crossed. The LC alignment, or rubbing direction 13 is at an angle $\Phi$ to the electrode 14, as shown.

Soref published the first IPS concept in *Applied Physics Letters*, Vol. 22, p. 165 (1973) and *Journal of Applied Physics* Vol. 45, p. 5466 (1974). In 1992, Kiefer et al extended such operating principle to display devices; results were published in *Japan Displays*, p.547 (1992). In 1995, Oh-e and Kondo applied such IPS mode to the thin-film-transistor liquid crystal display (TFT-LCD). Two papers have been published by M. Oh-e and K. Kondo in *Applied Physics Letters*, Vol. 67, 3895 (1995) and M. Oh-e, M. Yoneya and K. Kondo, *Journal of Applied Physics*, Vol. 82, 528 (1997). Since then, many papers have been published on this topic.

In the IPS mode, two types of LC alignments are considered: the homogeneous cell as shown in FIG. 2a and the π-cell as shown in FIG. 2b. In FIG. 2a, homogeneous cell 20, shows the LC pre-tilt angle ($\alpha$) on each surface 21 is tilted to the same direction so that the bulk LC directors are uniformly tilted to a direction. On the other hand, the π-cell 22 in FIG. 2b has opposite pre-tilt angles at the boundaries of top substrate 23 and bottom substrate 24. All the above-mentioned IPS modes use a homogeneous LC cell arrangement. The π-cell 22 is symmetric in the left (L) and right (R) viewing directions, but the homogeneous cell 20 is asymmetric.

Bos and Koehler/Beran first published the π-cell configuration in *Molecular Crystals and Liquid Crystals*, Vol.113, p.329 (1984). The π-cell eliminates the backflow of the LC directors and achieves a fast response time. However, their applied electric field is in the longitudinal direction. As a result, a bias voltage is needed to overcome the domain problem and phase compensation films are needed to achieve a wide viewing angle.

In U.S. Pat. No. 6,356,329 B1, Tamatani et al. used the π-cell configuration in the IPS electrodes. The viewing angle is as wide as an IPS homogeneous cell. An extra benefit of the IPS-π cell over the IPS-homogeneous cell is that its color shift at large oblique angles is reduced because of the symmetry of molecular alignment in the horizontal direction. However, in the U.S. Pat. No. '329 issued to Tamatani et al, the LC orientation angle is set at 10° with respect to the electrodes. The advantage is that the on-state voltage is low. However, the response time is slow. Response time is a critical issue to computer and television applications.

S. H. Lee et al. published a paper in *Soc. Inf. Displays*, Vol. 28, 711 (1997) reporting on the rubbing angle dependent response time. The LC mode studied by S. H. Lee et al. was the homogeneous cell, not the π-cell used in the present invention. Moreover, results of the research by S. H. Lee et al. indicate that after $\Phi \sim 20°$, the response time basically saturates. Thus, the response time reaches a certain minimum value and does not improve anymore even with further increases of $\Phi$. On the contrary, in the present invention, it was unexpectedly discovered that by increasing the LC orientation angle (i.e., rubbing angle) to 30–40°, the response time is shortened by 2–3 times as compared to that at $\Phi = 10°$; the brightness is improved more than 33%, and a more linear gray scale is obtained, while preserving a wide viewing angle.

SUMMARY OF THE INVENTION

A primary objective of the invention is to provide a new IPS π-cell configuration showing faster response time.

A secondary objective of the invention is to provide a new IPS π-cell with higher display brightness.

A third objective of the invention is to provide a new IPS π-cell with a more linear gray scale capability.

A fourth objective of the invention is to provide a new IPS π-cell with a lower threshold voltage.

Further objects and advantages of this invention will be apparent from the following detailed description of a presently preferred embodiment, which is illustrated, schematically in the accompanying drawings.

BRIEF DESCRIPTION OF THE FIGURES

FIG. 1 shows a typical, prior art liquid crystal cell configuration of the in-plane-switching mode.

FIG. 2a shows a prior art homogeneous cell wherein $\alpha$=pre-tilt angle.

FIG. 2b shows a prior art π-cell wherein $\alpha$=pre-tilt angle.

FIG. 3a shows the iso-contrast contours of the IPS liquid crystal displays using homogeneous cells.

FIG. 3b shows the iso-contrast contours of the IPS liquid crystal displays using π cells.

FIG. 4a shows the voltage-dependent transmittance of an IPS π-cell with $\Phi = 10°$.

FIG. 4b shows the voltage-dependent transmittance of an IPS π-cell with $\Phi = 30°$.

DESCRIPTION OF THE PREFERRED EMBODIMENTS

Figure 5:
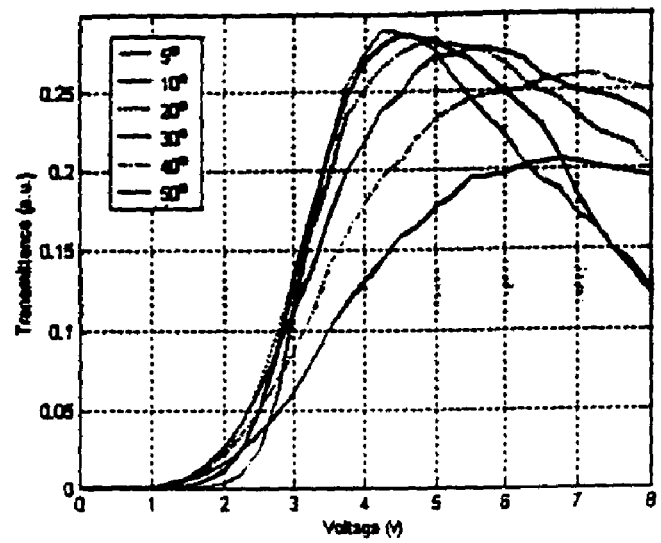
FIG. 5 shows the voltage-dependent transmittance of the IPS π-cells at various rubbing angles.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The invention provides a new device structure for achieving fast response time, higher brightness and more linear gray scale while preserving wide viewing angle. FIG. 1 shows a typical in-plane-switching structure. The principal axis of the polarizer is parallel to the LC alignment (i.e., rubbing) direction. The LC rubbing direction, i.e., LC director, is at an angle $\Phi$ with respect to the IPS electrodes. For example, in the U.S. Pat. No. 6,356,329 B1, $\Phi=10°$, in the voltage off state, the backlight is absorbed by the analyzer resulting in a normally black state. When the voltage is on, the LC directors are reoriented along the electric field direction. As a result, light transmits the crossed polarizers. Crossed polarizers are two polarizers that are set with their optical axes at 90°. In this case, when no voltage is applied, after the light passes through the first polarizer, it is blocked by the second polarizer (i.e. the analyzer) and the device shows a black state. With the application of voltage on LCs, the phase retardation of the LC changes and light leaks through the polarizers.

Two types of LC alignments can be used in IPS mode for achieving a normally black display: homogeneous and $\pi$ cells. FIG. 2a depicts the LC arrangement of the homogeneous cells and FIG. 2b shows the LC arrangement of the $\pi$ cells. The major difference is in the pre-tilt angle ($\alpha$). Because of the pre-tilt angle effect, the LC directors are aligned differently in the bulk so that their physical properties are drastically different. The $\pi$-cell is symmetric when viewed from right or left. However, the homogeneous cell is asymmetric. Therefore, the IPS $\pi$-cell should exhibit a weaker color shift than the homogeneous cell at a large oblique angle.

FIGS. 3a and 3b compare the viewing angle of the homogeneous and $\pi$ cells under the same conditions except for the different pre-tilt angles. The $\pi$-cell indeed shows a larger, wider viewing angle.

In the present invention, the focus is on the IPS $\pi$-cell configuration as shown in FIG. 2b. In particular, it was discovered that the large rubbing angle has an important effect on the performance of the display device. The rubbing angle or direction is an aligning direction of the liquid crystal molecules. The LC molecules are made uniform by rubbing an alignment layer on a substrate surface.

First, transmittance behavior is examined as a function of rubbing directions. In FIGS. 4a and 4b the voltage-dependent light transmittance is plotted for an IPS $\pi$-cell at $\Phi=10°$ and 30°, respectively. In simulations, the following parameters were used: LC mixture Merck MLC-6692 (birefringence $\Delta n=0.085$, dielectric anisotropy $\Delta\epsilon=10.3$ and rotational viscosity $\gamma_1=0.1$ Pas); LC cell gap d=4 $\mu$m, electrode width $\omega=4$ $\mu$m and electrode gap (from center to center) l=8 $\mu$m. The three wavelengths used for calculations are red (R)=650 nm, green (G)=550 nm and blue (B)=450 nm.

Both IPS $\pi$-cells at $\Phi=10°$ (FIG. 4a) and at $\Phi=30°$ (FIG. 4b) exhibit a relatively weak color dispersion for the three primary red, green blue (RGB) colors. This is a desirable feature for display application.

A further study of transmittance is shown in FIG. 5 which plots the voltage-dependent light transmittance of an IPS $\pi$-cell at different rubbing angles $\Phi=5, 10, 20, 30, 40$ and 50°. Specifications for the LC are: Merck MLC 6692, $d\Delta n=340$ nm, $\lambda=550$ nm, and pre-tilt angle $\alpha=1°$, $\lambda=550$ nm. The cell parameters remain unchanged. For simplicity, the transmittance at $\lambda=550$ nm is compared. As shown in FIG. 5, increasing the rubbing angle leads to three changes: (1) increased on-state voltage, (2) decreased threshold voltage and (3) reduced maximum transmittance.

From FIG. 5, the on-state voltage increases from 4.2 to 4.5, 5.0, 5.5 and 7.0V$_{rms}$ as $\Phi$ increases from 5 to 10, 20, 30 and 40°, respectively. In IPS mode, the polarizer is set parallel to the LC directors at V=0. Once the voltage exceeds a threshold, the LC directors are reoriented in the same plane. Maximum transmittance is obtained when the directors are rotated by 45° from their initial position. For the case of $\Phi=5°$, the maximum transmittance occurs when the LC directors are rotated to 50°. Thus, its on-state voltage is relatively low. However, for the case of $\Phi=40°$, the LC directors have to be rotated to 85°, i.e., nearly perpendicular to the IPS electrodes, in order to see the maximum transmittance. Thus, its on-state voltage is higher. For the case of $\Phi=50°$, although its on-state voltage swings back, its maximum transmittance is significantly reduced. As a result, this is not the best choice.

To reduce the on-state voltage, use either a higher dielectric anisotropy LC mixture or reduce the electrode gap. In one simulation, $\omega=3$ $\mu$m and l=6 $\mu$m is used, the on-state voltage of the $\Phi=30°$ cell is reduced from 5.5 to 4.75V$_{rms}$.

Figure 6:
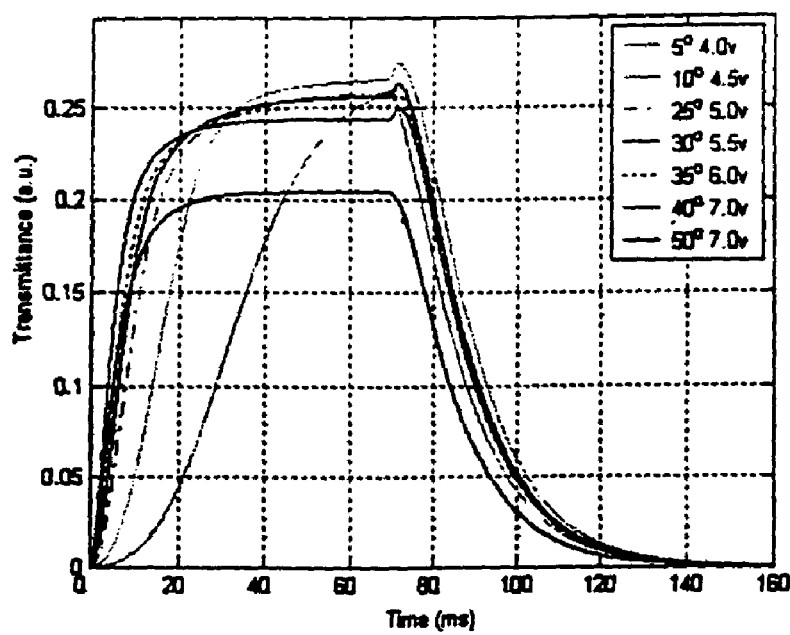
FIG. 6 shows the simulated response time of the IPS π-cells at different rubbing angles.

Transmittance is voltage dependent as discussed and demonstrated in FIG. 5; transmittance is also time-dependent as discussed below in an examination of the effects of rubbing angle on response time. FIG. 6 shows the simulated response time of the IPS $\pi$-cells at $\Phi=5, 10, 25, 30, 35, 40$ and 50°. Because of the different on-state voltages used, the voltage applied to each cell is specified in the legend of FIG. 6. Specifications for the LC materials are: Merck MLC-6692, $d\Delta n=340$ nm, $\lambda=550$ nm, and pre-tilt angle $\alpha=1°$.

In FIG. 6, the rise time (0–90%) decreases as $\Phi$ increases from 5 to 10, 25, 30, 35, and 40°. No noticeable difference is observed in the decay time. The rise time for $\Phi=40°$ and 10° is ~10 ms and 30 ms, respectively. This improvement is significant especially for TV and computer monitor applications where fast response time is needed. A much faster response time is obtained by simply increasing the rubbing angle to approximately 30–40°. This advantage is not realized in U.S. Pat. No. 6,356,329 B1.

Figure 7:
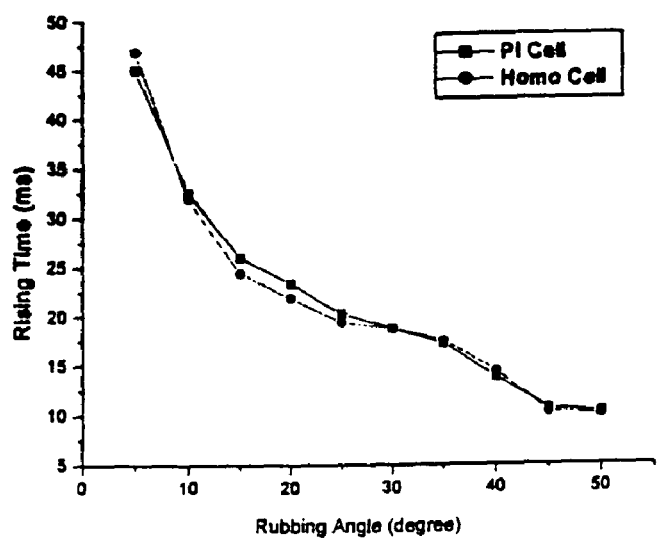
FIG. 7 compares the rise time of the IPS-π cell and homogeneous cell at various rubbing angles.

FIG. 7 compares the rise time of the IPS-$\pi$ cell and homogeneous cell at various rubbing angles. The cell gap is d=4 $\mu$m, LC is MLC-6692 and $\lambda=550$ nm. The rise time for $\Phi=40°$ and 10° is ~10 ms and 30 ms, respectively. Again, a much faster response time is obtained by simply increasing the rubbing angle to 30–40°.

Figure 8:
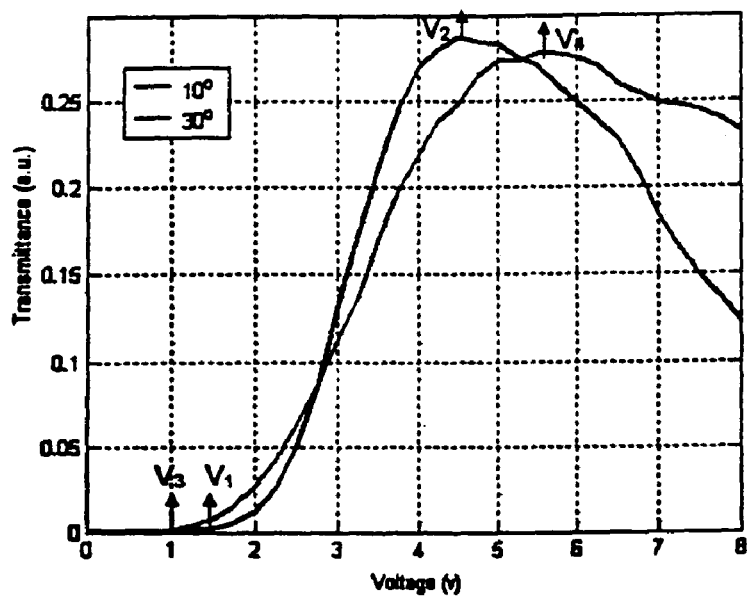
FIG. 8 shows the gray scale comparison of the IPS π-cells with $\Phi = 10°$ and 30°.

Another advantage of increasing rubbing angle is a more linear gray scale. FIG. 8 compares the gray scale of the IPS $\pi$-cell at $\Phi=10°$ and 30°. For the cases of $\Phi=10°$ and 30°, the threshold and on-state voltages are marked. From FIG. 8, $V_1 \sim 1.5$ and $V_2 \sim 4.5$ while $V_3 \sim 1.0$ and $V_4 \sim 5.5V_{rms}$. That means the IPS $\pi$-cell with $\Phi=30°$ has a more linear gray scale than that of $\Phi=10°$ claimed in U.S. Pat. No. 6,356,329 B1. The LCD cell characteristics used in this example are: MLC-6692, $d\Delta n=340$ nm, $\lambda=550$ nm, and pre-tilt angle $\alpha=1°$.

Figure 9:
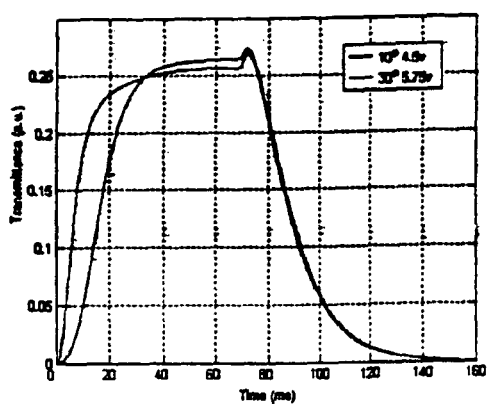
FIG. 9 compares the brightness of the IPS π-cells with $\Phi = 30°$ and 10°.

A faster response time also leads to higher display brightness. This is another advantage of the present invention. FIG. 9 compares the brightness of the IPS $\pi$-cells with $\Phi=10°$ and 30°. The brightness is proportional to the area covered by the transient transmittance curves. In the interest of fast response time, the switch-on time should be as fast as possible. The areas corresponding to t=20 ms are calculated. At t=20 ms, the Φ=30° mode has 136% higher brightness than the mode (Φ=10°) claimed in U.S. Pat. No. 6,356,329 B1. If time is increased to 40 ms, then the brightness gain is reduced to 33%. The specific LCD cell characteristics for FIG. 9 are: LC: Merck MLC-6692, dΔn=340 nm, λ=550 nm, and pre-tilt angle α=1°.

Figures 10A, 10B:
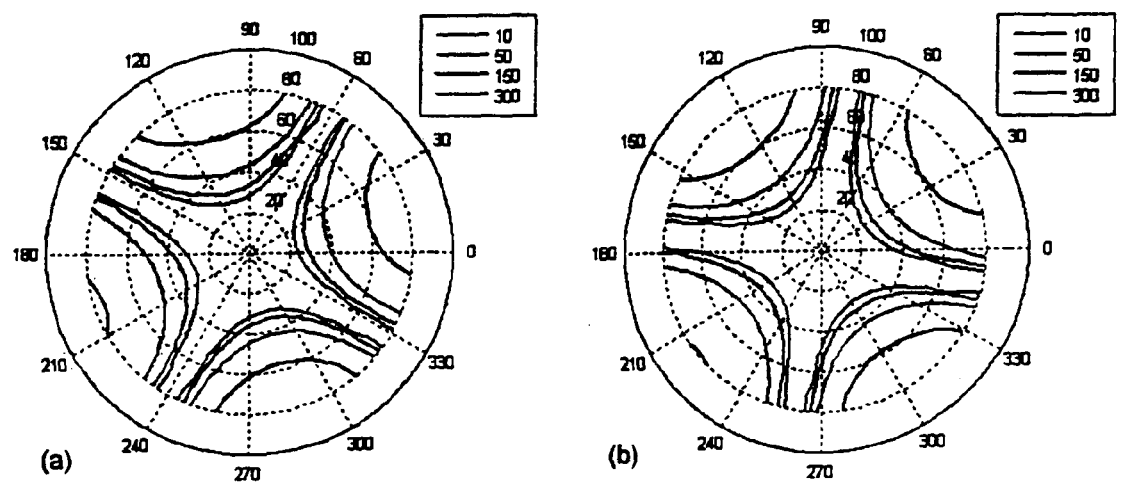
FIG. 10a shows the simulated viewing angle, iso-contrast contours, of the IPS π-cells with $\Phi = 30°$.
FIG. 10b shows the simulated viewing angle, iso-contrast countours, of the IPS π-cells with $\Phi = 10°$.

In FIG. 10, plots of the iso-contrast contours with contrast ratios CR=300:1, 150:1, 50:1 and 10:1 are shown. These two curves are nearly identical except that the orientation angle is shifted. Therefore, changing rubbing angle does not affect the viewing angle. The viewing angles of the IPS π-cells with Φ=30° and Φ~10° are simulated and viewing angle results are shown in FIGS. 10a and 10b, respectively. Again, there is no substantial change in viewing angle and the LCD cell characteristics are: LC: Merck MLC-6692, dΔn=340 nm, λ=550 nm, and pre-tilt angle α=1°.

In summary, our large rubbing angle, Φ>10°, preferably Φ~20–40°, IPS π-cell exhibits the following advantages over that claimed by Tamatani et al. in U.S. Pat. No. 6,356,329 B1: First, a 2–3 times faster rise time is obtained. Second, approximately 136% higher brightness during the first 20 ms switching on process is observed. Third, a lower threshold voltage is required. Fourth, more linear gray scale is obtained. The viewing angle remains the same, which is very wide. As LCD monitors replace more and more CRT monitors in televisions and computers, the present invention will have widespread application in the new LCD technology.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A liquid crystal display comprising:
a pi-cell liquid crystal display having a rubbing angle above approximately 30 degrees for improving a fast response time of the pi-cell liquid crystal display.

2. A method of improving fast response in-plane-switching pi-cell liquid crystal displays, comprising the steps of:
providing a pi-cell liquid crystal display having a rubbing angle; and
increasing the rubbing angle to above approximately 30 degrees to decrease the response time in the display.

3. The method of claim 2, wherein the step of increasing includes the step of:
increasing the rubbing angle to be between approximately 30 to approximately 40 degrees.

4. The method of claim 2, further comprising the step of:
increasing response time of the display by approximately 2 to approximately 3 times.

5. The method of claim 2, further comprising the step of:
improving brightness of the display by at least approximately 33 percent.

6. The method of claim 2, wherein the display includes: a computer monitor.

7. The method of claim 2, wherein the display includes: a television monitor.

8. The method of claim 2, further comprising the step of:
increasing linear grey scale of the display.

9. The method of claim 2, further comprising the step of:
maintaining wide viewing angle of the display.

10. A pi-cell liquid crystal display with improved fast response in-plane-switching, comprising:
a pi-cell liquid crystal display having a rubbing angle for decreasing a response time in the display while maintaining a wide viewing angle, wherein the rubbing angle is approximately 30 to approximately 40 degrees.

11. The liquid crystal display of claim 10, wherein said increased rubbing angle improves brightness of the display by at least approximately 33 percent.

12. The liquid crystal display of claim 10, wherein the display includes: a computer monitor.

13. The liquid crystal display of claim 10, wherein the display includes: a television monitor.

14. The liquid crystal display of claim 10, wherein said increased rubbing angle increases a linear grey scale of the display.

* * * * *

UNITED STATES PATENT AND TRADEMARK OFFICE
CERTIFICATE OF CORRECTION

PATENT NO. : 6,987,549 B2
APPLICATION NO. : 10/639985
DATED : January 17, 2006
INVENTOR(S) : Shin-Tson Wu et al.

Page 1 of 1

It is certified that error appears in the above-identified patent and that said Letters Patent is hereby corrected as shown below:

Title Page, Item [73] should read as follows:

Assignee(s): University of Central Florida Research Foundation, Inc., Orlando, FL (US) and AU Optronics Corporation, Taiwan, Republic of China Signed and Sealed this
Twenty-eighth Day of May, 2013

Teresa Stanek Rea
*Acting Director of the United States Patent and Trademark Office*